(12) United States Patent
Wheatley

(10) Patent No.: US 9,215,510 B2
(45) Date of Patent: Dec. 15, 2015

(54) SYSTEMS AND METHODS FOR AUTOMATICALLY TAGGING A MEDIA ASSET BASED ON VERBAL INPUT AND PLAYBACK ADJUSTMENTS

(71) Applicant: United Video Properties, Inc., Santa Clara, CA (US)

(72) Inventor: David John Wheatley, Tower Lakes, IL (US)

(73) Assignee: Rovi Guides, Inc., Santa Clara, CA (US)

(*) Notice: Subject to any disclaimer, the term of this patent is extended or adjusted under 35 U.S.C. 154(b) by 236 days.

(21) Appl. No.: 14/098,983

(22) Filed: Dec. 6, 2013

(65) Prior Publication Data

US 2015/0163558 A1  Jun. 11, 2015

(51) Int. Cl.
| | |
|---|---|
| H04N 7/16 | (2011.01) |
| H04H 60/33 | (2008.01) |
| H04N 21/6587 | (2011.01) |
| H04N 21/258 | (2011.01) |
| H04N 21/422 | (2011.01) |
| H04N 21/2387 | (2011.01) |
| H04N 21/8405 | (2011.01) |
| H04N 21/845 | (2011.01) |
| G06F 17/30 | (2006.01) |
| G10L 15/00 | (2013.01) |

(52) U.S. Cl.
CPC ...... *H04N 21/6587* (2013.01); *G06F 17/30849* (2013.01); *H04N 21/2387* (2013.01); *H04N 21/25891* (2013.01); *H04N 21/42203* (2013.01); *H04N 21/8405* (2013.01); *H04N 21/8456* (2013.01); *G10L 15/00* (2013.01)

(58) Field of Classification Search
CPC .............. H04N 21/2387; H04N 21/25891; H04N 21/42203; H04N 21/6587; H04N 21/8405; H04N 21/8456
USPC .............................................. 725/9–21
See application file for complete search history.

(56) References Cited

U.S. PATENT DOCUMENTS

| | | |
|---|---|---|
| 4,706,121 A | 11/1987 | Young |
| 4,868,750 A | 9/1989 | Kucera et al. |
| 5,014,125 A | 5/1991 | Pocock et al. |
| 5,222,121 A | 6/1993 | Shimada |

(Continued)

FOREIGN PATENT DOCUMENTS

| | | |
|---|---|---|
| EP | 0721253 A2 | 7/1996 |
| EP | 0911808 A1 | 4/1999 |

(Continued)

OTHER PUBLICATIONS

International Search Report issued Feb. 10, 2010 for PCT/US2009/001536 (now WO 2009/114134).

(Continued)

*Primary Examiner* — Joshua Taylor
(74) *Attorney, Agent, or Firm* — Ropes & Gray LLP

(57) ABSTRACT

Systems and methods for automatically tagging a media asset are provided. Verbal input is received from a user while the user is accessing the media asset. A request to adjust playback of the media asset is received from the user. Responsive to receiving the verbal input and the request, a combination of the verbal input and the request is cross-referenced with an attribute database to identify an attribute associated with the combination. The identified attribute is associated with the media asset.

20 Claims, 7 Drawing Sheets

700
Attribute Database

| Verbal Input | + | Playback Adjustment Performed | Attribute |
|---|---|---|---|
| Huh, What, I Don't Get it, Confusing, or Repeat | ; | Rewind, Fast-access Playback Operation in Reverse, or Previous Chapter/Segment | Difficult Plot/ Confusing But Interesting |
| This Stinks, I Hate this Show, Next, Too Confusing | ; | Stop, Pause, or Terminate Play | Not Interesting |
| Boring, Don't Like this Part, Slow | ; | Fast-forward, Fast-access Playback Operation Forward, or Next Chapter/Segment | Slow Plot But Interesting |
| ⋮ | | ⋮ | ⋮ |

(56) References Cited

U.S. PATENT DOCUMENTS

| | | | |
|---|---|---|---|
| 5,231,494 A | 7/1993 | Wachob | |
| 5,459,306 A | 10/1995 | Stein et al. | |
| 5,559,548 A | 9/1996 | Davis et al. | |
| 5,589,892 A | 12/1996 | Knee et al. | |
| 5,627,940 A | 5/1997 | Rohra et al. | |
| 5,635,978 A | 6/1997 | Alten et al. | |
| 5,659,350 A | 8/1997 | Hendricks et al. | |
| 5,699,107 A | 12/1997 | Lawler et al. | |
| 5,737,030 A | 4/1998 | Hong et al. | |
| 5,758,320 A | 5/1998 | Asano | |
| 5,774,841 A | 6/1998 | Salazar et al. | |
| 5,774,859 A | 6/1998 | Houser et al. | |
| 5,781,246 A | 7/1998 | Alten et al. | |
| 5,915,238 A | 6/1999 | Tjaden | |
| 6,014,184 A | 1/2000 | Knee et al. | |
| 6,016,336 A | 1/2000 | Hanson | |
| 6,081,782 A | 6/2000 | Rabin | |
| 6,081,830 A | 6/2000 | Schindler | |
| 6,177,931 B1 | 1/2001 | Alexander et al. | |
| 6,239,794 B1 | 5/2001 | Yuen et al. | |
| 6,275,268 B1 | 8/2001 | Ellis et al. | |
| 6,314,402 B1 | 11/2001 | Monaco et al. | |
| 6,323,911 B1 | 11/2001 | Schein et al. | |
| 6,324,512 B1 | 11/2001 | Junqua et al. | |
| 6,330,537 B1 | 12/2001 | Davis et al. | |
| 6,331,877 B1 | 12/2001 | Bennington et al. | |
| 6,357,043 B1 | 3/2002 | Ellis et al. | |
| 6,370,238 B1 | 4/2002 | Sansone et al. | |
| 6,373,528 B1 | 4/2002 | Bennington et al. | |
| 6,388,714 B1 | 5/2002 | Schein et al. | |
| 6,396,546 B1 | 5/2002 | Alten et al. | |
| 6,415,257 B1 | 7/2002 | Junqua et al. | |
| 6,418,556 B1 | 7/2002 | Bennington et al. | |
| 6,438,752 B1 | 8/2002 | McClard | |
| 6,452,640 B1 | 9/2002 | Yuen et al. | |
| 6,463,585 B1 | 10/2002 | Hendricks et al. | |
| 6,477,500 B2 | 11/2002 | Maes | |
| 6,563,430 B1 | 5/2003 | Kemink et al. | |
| 6,564,378 B1 | 5/2003 | Satterfield et al. | |
| 6,564,379 B1 | 5/2003 | Knudson et al. | |
| 6,591,292 B1 | 7/2003 | Morrison et al. | |
| 6,606,280 B1 | 8/2003 | Knittel | |
| 6,615,248 B1 | 9/2003 | Smith | |
| 6,654,721 B2 | 11/2003 | Handelman | |
| 6,665,644 B1 | 12/2003 | Kanevsky et al. | |
| 6,684,194 B1 | 1/2004 | Eldering et al. | |
| 6,698,020 B1 | 2/2004 | Zigmond et al. | |
| 6,714,917 B1 | 3/2004 | Eldering et al. | |
| 6,742,183 B1 | 5/2004 | Reynolds et al. | |
| 6,756,997 B1 | 6/2004 | Ward, III et al. | |
| 6,763,332 B1 | 7/2004 | Fujii | |
| 6,766,374 B2 | 7/2004 | Trovato et al. | |
| RE38,600 E | 9/2004 | Mankovitz | |
| 6,842,767 B1 | 1/2005 | Partovi et al. | |
| 6,886,030 B1 | 4/2005 | Easterbrook et al. | |
| 6,898,762 B2 | 5/2005 | Ellis et al. | |
| 7,006,881 B1 | 2/2006 | Hoffberg et al. | |
| 7,028,326 B1 | 4/2006 | Westlake et al. | |
| 7,051,360 B1 | 5/2006 | Ellis et al. | |
| 7,165,098 B1 | 1/2007 | Boyer et al. | |
| 7,330,890 B1 | 2/2008 | Partovi et al. | |
| 7,539,659 B2 * | 5/2009 | Wong | G06F 17/30035 706/62 |
| 7,552,460 B2 | 6/2009 | Goldman | |
| 7,630,966 B2 | 12/2009 | Arora | |
| 7,761,892 B2 | 7/2010 | Ellis et al. | |
| 7,817,301 B2 | 10/2010 | Ohno et al. | |
| 7,941,819 B2 | 5/2011 | Stark et al. | |
| 8,046,801 B2 | 10/2011 | Ellis et al. | |
| 8,065,286 B2 | 11/2011 | Jones | |
| 8,146,117 B2 | 3/2012 | Knudson et al. | |
| 2001/0044745 A1 | 11/2001 | Shaw | |
| 2002/0042914 A1 | 4/2002 | Walker et al. | |
| 2002/0049973 A1 | 4/2002 | Alten et al. | |
| 2002/0052746 A1 | 5/2002 | Handelman | |
| 2002/0056087 A1 | 5/2002 | Berezowski et al. | |
| 2002/0056088 A1 | 5/2002 | Silva et al. | |
| 2002/0073427 A1 | 6/2002 | Morrison et al. | |
| 2002/0078450 A1 | 6/2002 | Bennington et al. | |
| 2002/0095676 A1 | 7/2002 | Knee et al. | |
| 2002/0129368 A1 | 9/2002 | Schlack et al. | |
| 2002/0174430 A1 | 11/2002 | Ellis et al. | |
| 2003/0093790 A1 | 5/2003 | Logan et al. | |
| 2003/0110499 A1 | 6/2003 | Knudson et al. | |
| 2003/0145323 A1 | 7/2003 | Hendricks et al. | |
| 2003/0146940 A1 | 8/2003 | Ellis et al. | |
| 2004/0078820 A1 | 4/2004 | Nickum | |
| 2005/0015804 A1 | 1/2005 | LaJoie et al. | |
| 2005/0028208 A1 | 2/2005 | Ellis et al. | |
| 2005/0131727 A1 | 6/2005 | Sezan et al. | |
| 2005/0149964 A1 | 7/2005 | Thomas et al. | |
| 2005/0251827 A1 | 11/2005 | Ellis et al. | |
| 2005/0262542 A1 | 11/2005 | DeWeese et al. | |
| 2005/0283796 A1 | 12/2005 | Flickinger | |
| 2006/0093998 A1 * | 5/2006 | Vertegaal | G06F 3/011 434/236 |
| 2006/0190966 A1 | 8/2006 | McKissick et al. | |
| 2007/0011161 A1 | 1/2007 | Norton et al. | |
| 2007/0053513 A1 | 3/2007 | Hoffberg | |
| 2007/0174244 A1 | 7/2007 | Jones | |
| 2007/0240181 A1 | 10/2007 | Eldering et al. | |
| 2008/0127266 A1 | 5/2008 | Ward et al. | |
| 2008/0189744 A1 | 8/2008 | Schein et al. | |
| 2008/0288980 A1 | 11/2008 | Schein et al. | |
| 2009/0006333 A1 | 1/2009 | Jones et al. | |
| 2009/0092374 A1 | 4/2009 | Kulas | |
| 2009/0164904 A1 | 6/2009 | Horowitz et al. | |
| 2009/0172150 A1 | 7/2009 | Alkov et al. | |
| 2009/0235298 A1 | 9/2009 | Carlberg et al. | |
| 2010/0042460 A1 | 2/2010 | Kane, Jr. | |
| 2010/0107184 A1 * | 4/2010 | Shintani | H04N 21/4436 725/10 |
| 2011/0145847 A1 * | 6/2011 | Barve | H04H 60/64 725/9 |
| 2012/0016860 A1 | 1/2012 | Jones | |
| 2012/0084370 A1 | 4/2012 | Heywood et al. | |
| 2012/0271894 A1 | 10/2012 | Mirrashidi et al. | |

FOREIGN PATENT DOCUMENTS

| | | |
|---|---|---|
| WO | WO-97/13368 A1 | 4/1997 |
| WO | WO-9826584 A1 | 6/1998 |
| WO | WO-9843183 A1 | 10/1998 |
| WO | WO-9901984 A1 | 1/1999 |
| WO | WO-9904561 A1 | 1/1999 |
| WO | WO-99/35847 A1 | 7/1999 |
| WO | WO-00/41390 A1 | 7/2000 |
| WO | WO-2009/114134 | 9/2009 |

OTHER PUBLICATIONS

U.S. Appl. No. 11/324,202, filed Dec. 29, 2005 (abandoned).
U.S. Appl. No. 09/332,244, filed Jun. 11, 1999 (abandoned).
U.S. Appl. No. 09/717,729, filed Nov. 21, 2000 (abandoned).
U.S. Appl. No. 09/492,713, filed Jan. 27, 1999 (abandoned).
U.S. Appl. No. 09/378,533, filed Aug. 20, 1999 (abandoned).
U.S. Appl. No. 09/357,941, filed Jul. 16, 1999 (abandoned).
U.S. Appl. No. 09/356,270, filed Jul. 16, 1999 (abandoned).
U.S. Appl. No. 09/356,268, filed Jul. 16, 1999 (abandoned).
U.S. Appl. No. 09/356,245, filed Jul. 16, 1999 (abandoned).
U.S. Appl. No. 09/346,134, filed Jul. 16, 1999 (abandoned).
U.S. Appl. No. 09/110,667, filed Jul. 7, 1998 (abandoned).
U.S. Appl. No. 09/070,700, filed Apr. 30, 1998 (abandoned).
U.S. Appl. No. 09/070,604, filed Apr. 30, 1998 (abandoned).
U.S. Appl. No. 09/034,939, filed Mar. 4, 1998 (abandoned).
U.S. Appl. No. 10/195,228, filed Jul. 11, 2002 (abandoned).
Press Release, Prevue Networks, Inc., Prevue and BBN Hark Add Speech Recognition Technology to Interactive Guide (May 8, 1995).
Price Coleman, *The Power of Speech*, Convergence, Aug. 1995, pp. 16-23.
Fred Dawson, *Look Ma, No Hands*, Broadband Week, May 22, 1995, pp. 37 and 40.

* cited by examiner

Expected Playback Adjustment Database 600

| Verbal Input 610 | Expected Playback Adjustment 612 | Threshold Time 614 |
|---|---|---|
| "Huh", "What", "I Don't Get it", "Repeat", "Confusing" | Rewind, Fast-access Playback Operation in Reverse, Previous Chapter/Segment | 7 Seconds |
| "This Stinks", "I Hate this Show", "Next", "Too Confusing" | Stop, Pause | None, Infinity |
| "Boring", "Don't Like this Part", "Slow" | Fast-forward, Fast-access Playback Operation Forward, Next Chapter/Segment | 3 Seconds |
| ... | ... | ... |

FIG. 6

700
Attribute Database

| Verbal Input + | Playback Adjustment Performed | Attribute |
|---|---|---|
| Huh, What, I Don't Get it, Confusing, or Repeat | Rewind, Fast-access Playback Operation in Reverse, or Previous Chapter/Segment | Difficult Plot/ Confusing But Interesting |
| This Stinks, I Hate this Show, Next, Too Confusing | Stop, Pause, or Terminate Play | Not Interesting |
| Boring, Don't Like this Part, Slow | Fast-forward, Fast-access Playback Operation Forward, or Next Chapter/Segment | Slow Plot But Interesting |
| ... | | ... |

FIG. 7

SYSTEMS AND METHODS FOR AUTOMATICALLY TAGGING A MEDIA ASSET BASED ON VERBAL INPUT AND PLAYBACK ADJUSTMENTS

BACKGROUND

Traditional systems associate attributes or tags with media assets or segments based on a variety of factors. These factors may include manual user selection of attributes and crowd sourcing attribute assignments. However, these factors and methods of associating attributes/tags with media assets or segments place a burden on users.

SUMMARY

In view of the foregoing, systems and methods for automatically associating tags or attributes with a media asset based on verbal input and playback adjustments in accordance with various embodiments of the present invention are provided.

In some embodiments, verbal input may be received from a user while the user is accessing a media asset. The verbal input may be processed to convert the verbal input from analog form to digital form. The digital representation of the verbal input may be further processed to generate words/phrases that are included in the verbal input. The verbal input may be cross-referenced with a database to identify an expected playback adjustment that is associated with the verbal input. In some implementations, the database may be specific to a particular media asset or media asset segment.

In some implementations, a threshold period may also be retrieved from the database that corresponds to the received verbal input and expected playback adjustment. In some implementations, the threshold period may represent a maximum amount of time within receiving the verbal input that the expected playback adjustment is requested. Specifically, the threshold time indicates how long after receiving the verbal input the expected playback adjustment is expected to be received. In some implementations, the threshold period may represent a maximum amount of time within receiving a request to perform a playback adjustment that the verbal input is received. Specifically, the threshold time indicates how long after receiving the request to perform a playback adjustment the verbal input is expected to be received.

In some implementations, a request to adjust playback of the media asset may be received. The request to adjust playback of the media asset may be achieved by one or more input techniques (e.g., voice input, gesture, input device, second screen device, remote control, etc.). The request may be received before or after the verbal input is cross-referenced with a database to identify an expected playback adjustment associated with the verbal input. In some implementations, the requested playback adjustment may be compared with the expected playback adjustment. If the requested playback adjustment matches the expected playback adjustment, a combination of the verbal input and the requested playback adjustment may be cross-referenced with an attribute database. The attribute database may identify an attribute associated with the combination of the verbal input and the requested playback adjustment.

In some embodiments, an expected playback adjustment may not be retrieved from a database. In particular, after receiving the verbal input from the user, all playback adjustment requests are monitored. In response to receiving any playback adjustment request, the combination of the requested playback adjustment and the verbal input may be cross-referenced with an attribute database to identify an attribute associated with the combination.

In some embodiments, the request to adjust playback may be received before the verbal input is received. In such circumstances, after receiving a request to adjust playback, verbal input may be monitored. The combination of the requested playback adjustment and the verbal input may be cross-referenced with the attribute database to identify an attribute associated with the combination.

In some embodiments, the identified attribute may include a reduced rating when the combination of the verbal input and requested playback adjustment includes a word or phrase associated with user confusion and a request to stop playback. In such circumstances, the attribute may be associated with the media asset by reducing a rating of the media asset.

In some implementations, an amount of time between when the verbal input was received and when the playback adjustment was requested may be measured. The amount of time may be compared with the retrieved threshold period. In response to determining, that the amount of time is within the threshold period, the attribute database may be cross-referenced. In response to determining, that the amount of time is not within the threshold period, the attribute database may not be cross-referenced and an attribute may not be associated with the media asset.

In some embodiments, the identified attribute and an identifier of the media asset may be transmitted to a remote server. The remote server may receive multiple attributes from various users and may generate a representative attribute based on the received attributes. Each attribute from the various users may be generated by user equipment associated with each user based on the combination of the verbal input and the requested playback adjustment. The representative attribute may be associated with the media asset. For example, the attribute may be a rating adjustment. In some implementations, the rating of the media asset may be adjusted up or down based on the number of attributes that are received indicating an up/down rating adjustment. Specifically, if a majority of the attributes the server receives correspond to a decrease in a rating of the media asset, the remote server may reduce the rating of the media asset.

In some embodiments, a recommendation and/or search result may be generated based on the attribute associated with the media asset. For example, an advertisement may be added to a segment of a media asset determined to have an attribute of a first type (e.g., an interesting segment). Alternatively, an advertisement may be removed from a segment of a media asset determined to have an attribute of a second type (e.g., a boring segment).

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 shows an illustrative database of expected playback adjustments associated with verbal inputs in accordance with an embodiment of the invention;

FIG. 7 shows an illustrative database of attributes associated with a combination of verbal input and playback adjustments in accordance with an embodiment of the invention;

DETAILED DESCRIPTION

Figure 1:
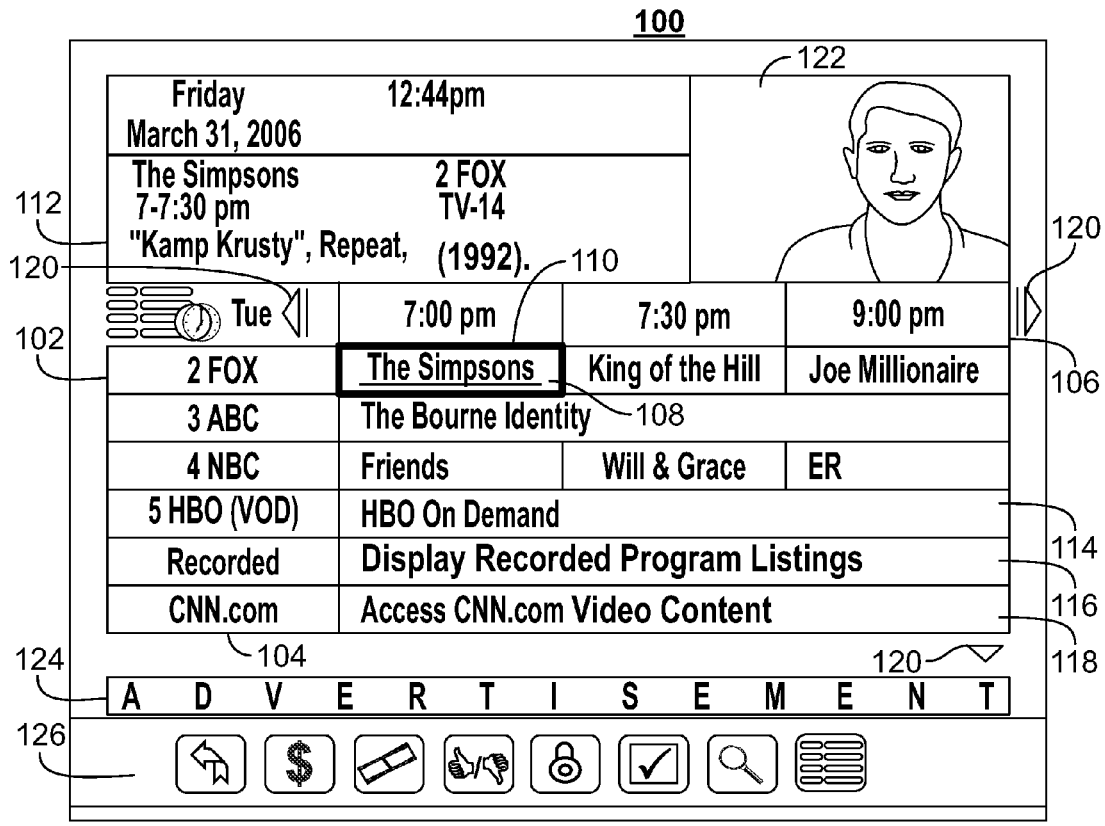
FIGS. 1 and 2 show illustrative display screens that may be used to provide media guidance application listings in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), user-generated content (e.g., video or music content), long-form content (e.g., television shows, movies, etc.), user uploaded content, short-form content (e.g., user-generated content, video, music content, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), messages from a crowd of users on a social network, messages from a crowd of users posted to a blog or website, genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. In some implementations, this data may be referred to as a data feed. As referred to herein the term "crowd" should be understood to mean any number of users greater than one.

Figure 2:
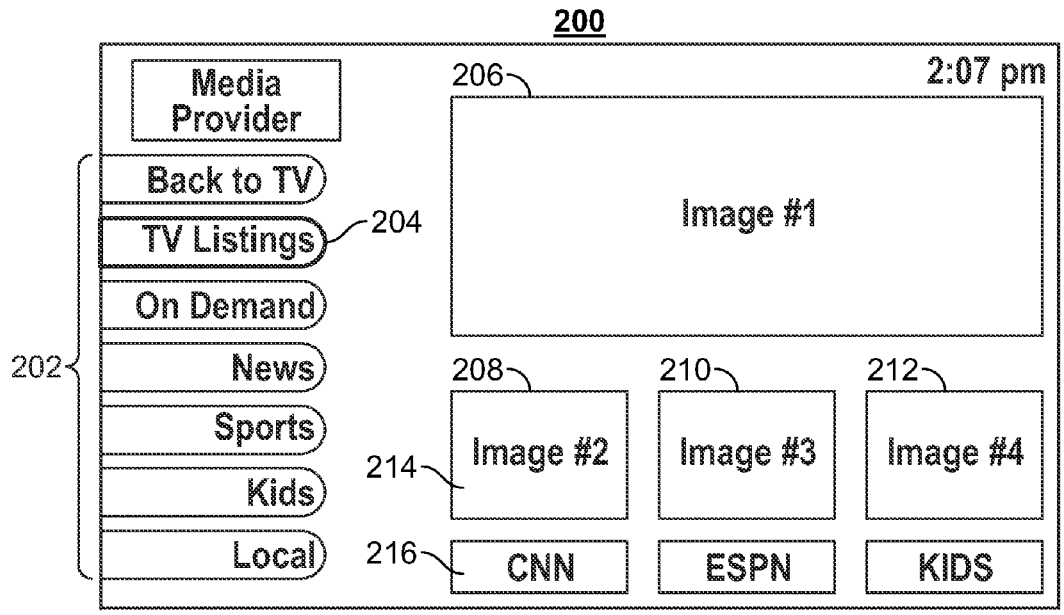
Figure 5:
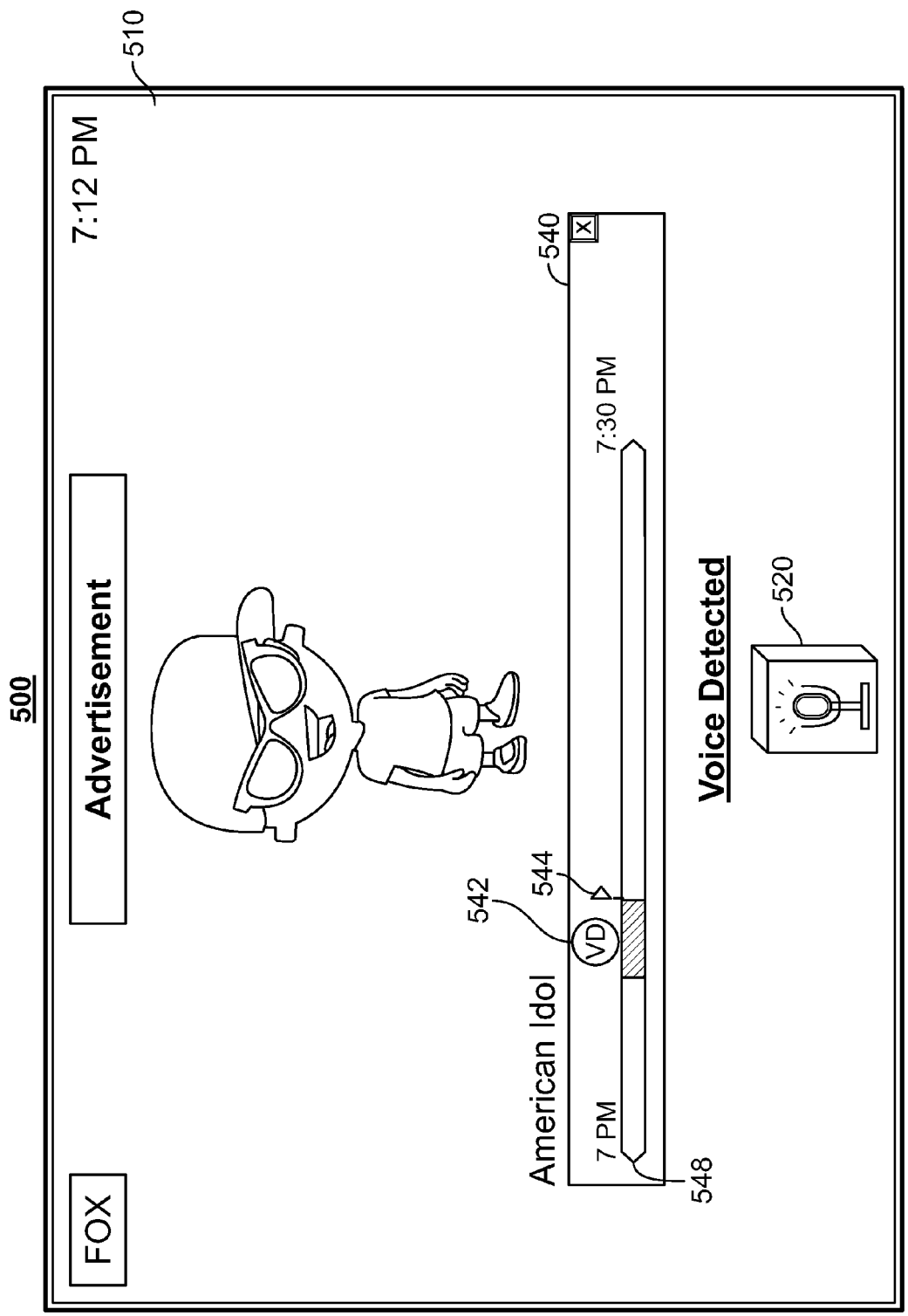
FIG. 5 shows an illustrative display screen of verbal input received while a media asset is accessed in accordance with an embodiment of the invention.

FIGS. 1-2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information. Media guidance data may include any information needed to generate the database discussed herein. For example, media guidance data may include data needed to generate database 600 and/or database 700 (FIGS. 6 and 7).

As referred to herein, the phrase "in response" should be understood to mean automatically, directly and immediately as a result of, without further input from the user, or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to, or alternative to, providing access to linear programming (e.g., content that is scheduled to be transmitted to a plurality of user equipment devices at a predetermined time and is provided according to a schedule), the media guidance application may also provide access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Advertisements may be added or removed from different segments of a media asset based on one or more attributes retrieved from database 700 (FIG. 7). Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, identifying media asset segment start and end times, performing a fast-access playback operation, performing a jump segment operation or skip commercials operation, or other features. Options available from a main menu display may include search options, VOD options (e.g., fast-access playback operations), parental control options, Internet options, cloud-based options, device synchronization options, like options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. The user profile information may include identifiers of one or more social networks or blogs the user is associated with. For each social network or blog a username and password (e.g., log-in information) may be stored in the user profile information. Control circuitry 304 may utilize this information in the user profile to automatically access the social network or blog to post or transmit information/content/segments to or retrieve information/contents/segments from the social network or blog. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
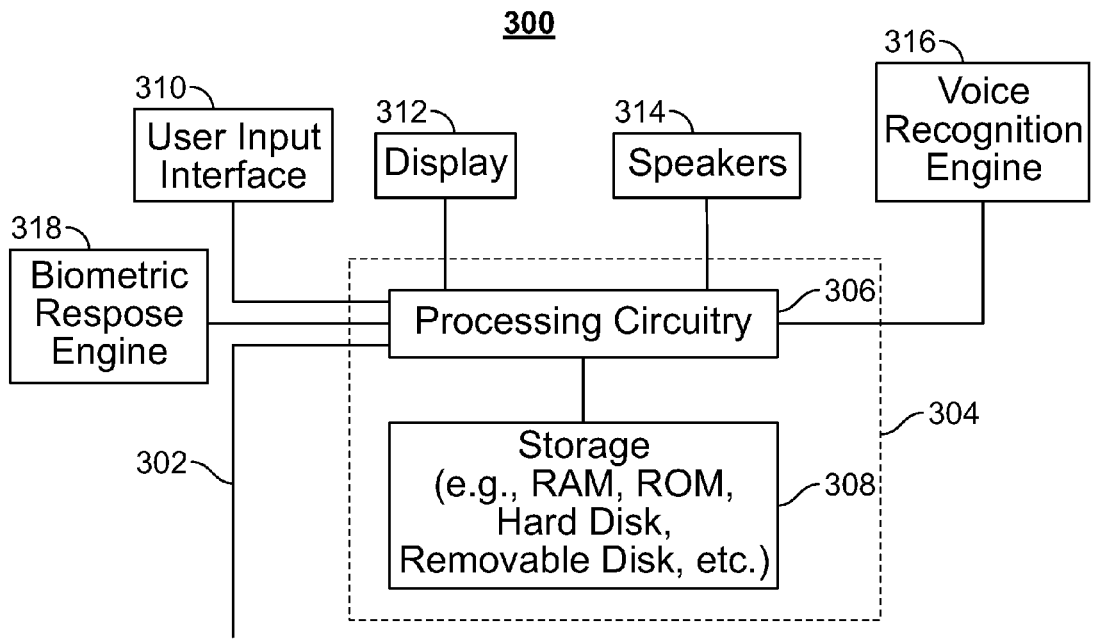
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. The group of users may be users in a certain geographical location (e.g., in the same home) or users that are associated with each other on a social network.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In some embodiments, control circuitry 304 may include voice or verbal input processing circuitry, such as a voice recognition engine 316. This voice or verbal input processing circuitry may include any interface that performs a voice recognition process. Control circuitry 304 may continuously or periodically access the microphone of user input interface 310 to detect the presence of voice input. Upon detecting voice input, control circuitry 304 may utilize voice recognition engine 316 (implemented in software or with dedicated circuitry) to identify words/phrases in the voice input. As used herein, voice input, speech input, spoken words, speech, and verbal input are interchangeable terms and should be understood to have the same meaning. The voice recognition process may perform analog-to-digital conversion on the voice input and process the digital information to form a digital representation of the voice input (e.g., a digital sentence with the identified words/phrases). The voice recognition process may output to another component of control circuitry 304 the identified or extracted words or phrases for further processing. For example, voice recognition engine 316 may transmit the digital representation of the voice or verbal input (e.g., a sentence, word, words and/or phrase) to a database of expected playback adjustments.

In some embodiments, the database of expected playback adjustments may identify and retrieve one or more expected playback adjustments that correspond to the verbal input. In some implementations, the database may retrieve a threshold period of time of receiving the verbal input within which the expected playback adjustments would be performed. In accordance with process 800 (FIG. 8), control circuitry 304 may monitor user inputs to determine whether a playback adjustment is requested by the user that matches one or more of the expected playback adjustments and is within (at or before) the threshold period of time. In some implementations, the database may retrieve a threshold period of time of receiving a request to perform a playback adjustment after which the verbal input is received.

In some embodiments, the database of expected playback adjustments may identify and retrieve one or more expected verbal inputs that correspond to a user requested playback adjustment. In some implementations, the database may retrieve a threshold period of time of receiving the requested playback adjustment within which the verbal input would be received. In accordance with process 900 (FIG. 9), control circuitry 304 may monitor user inputs to determine whether a playback adjustment is requested by the user and may then monitor for the receipt of verbal input to determine whether the verbal input is within (at or before) the threshold period of time of the request to perform the playback adjustment.

Control circuitry 304 may then cross-reference an attributes database to identify an attribute that corresponds to the combination of the received verbal input and the requested playback adjustment. In some implementations, voice recognition engine 316 may be implemented to only respond to a voice received from a particular user or group of users. For example, in an environment where multiple users are present and from whom all of their voices are received by user input interface 310, control circuitry 304 may only respond to one or a selected few of the voices. This way, only one or the selected members of the users can be authorized to provide instructions using verbal commands to control circuitry 304.

As referred to herein, the phrase "playback adjustment" should be understood to mean any type of modification that affects the timing or the order in which a media asset is presented to the user. For example, the playback adjustment may include a pause command, stop command or any fast-access playback operation. Fast-access playback operations should be understood to mean any operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

In some embodiments, control circuitry 304 may include a biometric response engine 318. Biometric response engine 318 may include circuitry that remotely or directly monitors a user's physiological and physical responses to content being presented. For example, biometric response engine 318 may include a heart pulse rate monitor, facial expression or position detection circuitry, eye movement and position detection circuitry, breathing pattern detection circuitry, user position and orientation detection circuitry, and/or any combination thereof. Control circuitry 304 may continuously or periodically access biometric response engine 318 to detect any changes in physiological and/or physical attributes of a user at or during specified sections of a media content being presented. Upon detecting a change in the biometric response of the user, control circuitry 304 may utilize a biometric response database to identify a corresponding set of instructions to perform. In some implementations, biometric response engine 318 may be implemented to respond only to biometric responses of a particular user or group of users. For example, in an environment where multiple users are present and from whom all of their biometric responses are received, control circuitry 304 may respond to only one or a selected few of the biometric responses.

The biometric response database may include a mapping between a given biometric response and a set of instructions for processing by control circuitry 304. For example, a biometric response entry in the biometric response database may include a voice command keyword (e.g., playback, pause, record, rewind, fast-forward, change channel, channel up, channel down, access source 1, access source 2) and the corresponding instructions may be stored for the entry that instruct control circuitry 304 to perform the function identified by the keyword. In some embodiments, a request to perform the playback adjustment may be received from the user verbally. In such circumstances, control circuitry 304 may use the biometric response database to determine the playback adjustment that matches the verbal input from the user requesting the playback adjustment. The request to adjust playback of the media asset or perform a playback adjustment operation may be achieved by one or more input techniques (e.g., voice input, gesture, input device, second screen device, remote control, etc.).

In client-server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. For example, storage 308 may be used to store the contents of expected playback adjustment database 600 and attributes database 700 (FIGS. 6 and 7). Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, microphone, touch screen, touchpad, stylus input, joystick, voice recognition interface, or other user input interfaces. User input interface 310 may include keys or displayed options that enable a user to instruct control circuitry 304 to mark a segment as a liked segment (e.g., to start/stop marking of a liked segment). Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
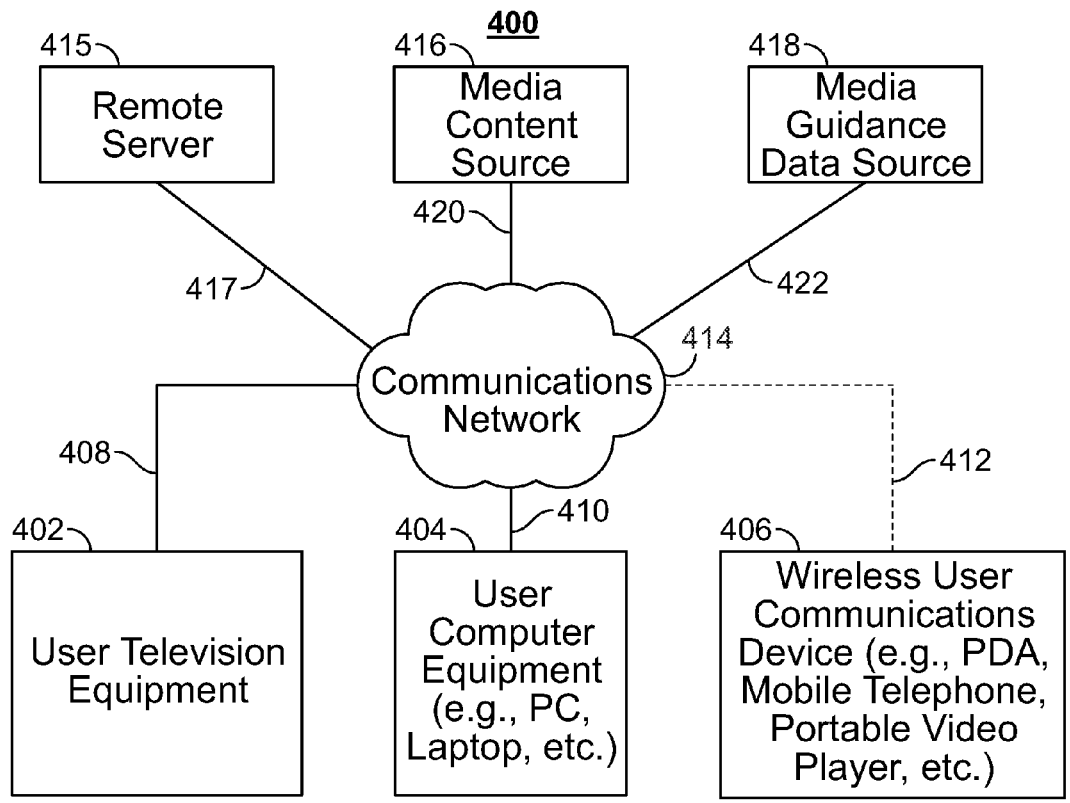
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites, blogs, news sites, or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry 304 (of a user equipment device or remote server 415) may retrieve a media asset (or portion of the media asset) from storage 308 or receive a live transmission or broadcast of the media asset from a content source. Control circuitry 304 may present the media asset and monitor for receipt of verbal input from the user and receipt of one or more user requests to adjust playback. Control circuitry 304 may process the verbal input to generate a communication that includes a digitized version of the verbal input with the words the user spoke while accessing the media asset. Control circuitry 304 may store an indication of a current playback position at the time the verbal input was received or a position that precedes the playback position when the verbal input was received by a predetermined amount (e.g., 5 seconds). Control circuitry 304 may add the playback position, as well as an identifier of the media asset (e.g., a title of the media asset) to the communication for transmission to expected playback adjustment database 600 (FIG. 6).

Database 600 may return an expected playback adjustment and/or threshold time associated with the received verbal input. Control circuitry 304 may determine whether a user request to perform a playback adjustment matching the expected playback adjustment was received within the threshold time. In response to determining that the playback adjustment matches the expected playback adjustment and was received within the threshold period of time, control circuitry 304 may cross-reference a combination of the received words/phrases and requested playback adjustment with an attributes database 700 (FIG. 7) to retrieve an associated attribute. The attribute may then be associated with the media asset and used for future searches and/or recommendations to users, insert/remove advertisements from the media asset or segment of the media asset, and/or may be used to automatically adjust a rating associated with the media asset.

In some embodiments, database 600 and database 700 may be combined into a single database. In such circumstances, control circuitry 304 may cross-reference the combined database once to identify an attribute based on a combination of received verbal input and requested playback adjustment. Specifically, the expected playback adjustment retrieval may be skipped so that control circuitry 304 always cross-references any combination of verbal input and playback adjustment received while a user consumes a media asset to retrieve an associated attribute.

FIG. 5 shows an illustrative display screen of verbal input received while a media asset is accessed in accordance with an embodiment of the invention. Screen 500 includes a media asset 510, an information overlay 540, and a voice detection indicator 520.

The media asset displayed in screen 500 may be a linear or non-linear media asset. For example, in some implementations, the media asset may be a live broadcast of an event. A user may be consuming the media asset and provide verbal input to control circuitry 304 about the media asset 510 or control circuitry 304 may monitor biometric information of the user while the user consumes media asset 510. In response to receiving a user request for further information, control circuitry 304 may generate for display information overlay 540. Information overlay 540 may include any information identifying or describing media asset 510 (e.g., a title, detailed description, content rating, etc.) and a transport bar 548. Transport bar 548 may indicate to the user a current position 544 within media asset 510 relative to a start time and an end time of media asset 510. In some embodiments, information overlay 540 may not be displayed at all before or after verbal input is received from the user.

In some embodiments, control circuitry 304 may monitor for verbal input from the user while the user consumes media asset 510. In some embodiments, control circuitry 304 may automatically (without user input) continuously or periodically process verbal input received from the user. In some embodiments, control circuitry 304 may process verbal input in response to receiving a user selection of visual indicator 520. Specifically, the user may press or select visual indicator 520 while speaking and release the button or unselect indicator 520 when the user finishes speaking. In some embodiments, control circuitry 304 may be associated with a user that is part of a population of users selected to have verbal input analyzed during content consumption. Specifically, the user may be provided an option (not shown) to participate (or not to participate) in having their voice or verbal input monitored by control circuitry 304 to assist in tagging content. In some embodiments, the verbal input may be monitored after or in response to receiving a request to perform a playback adjustment.

In some implementations, in response to receiving a user selection of the option to participate in having verbal input monitored, the cost for accessing the media asset during which the verbal input is monitored may be reduced. Alternatively or in addition, in response to receiving a user selection of the option to participate, the media asset during which the verbal input is monitored may be presented to the user without advertisements or with a limited set of advertisements. The limited set of advertisements may be lower or shorter than that presented to a portion of the population that does not participate in having its verbal input monitored during access to the media asset. Participation in the population for which verbal input is monitored may occur automatically in response to receiving a user selection of visual indicator 520. The monitoring of the verbal input of the user terminates when the corresponding media asset concludes. In certain embodiment, visual indicator 520 may not be displayed or presented to the user. For example, the user may press a button on a remote control to initiate verbal input monitoring. Alternatively, verbal input may be monitored automatically and in such circumstances, visual indicator 520 may not be displayed.

Control circuitry 304 may process the verbal input received during the period of time indicator 520 was actuated or selected by the user. Visual indicator 520 may be displayed persistently or intermittently to allow a user to input a request to provide verbal input. Alternatively, when control circuitry 304 continuously or periodically monitors for verbal input, control circuitry 304 displays indicator 520 to inform the user that a verbal input has been detected and is being monitored and/or processed.

In response to determining that the verbal input has been received, control circuitry 304 may process the verbal input to generate the communication for transmission to database 600. In some implementations, control circuitry 304 may display a visual indicator 542 in transport bar 548 to indicate to the user the relative playback time of when the verbal input was received.

In some embodiments, verbal input may be monitored in response to receiving a user request to perform a playback adjustment. In such circumstances, in response to receiving verbal input following the request to perform the playback adjustment, control circuitry 304 may generate a combined query that includes the verbal input and the requested playback adjustment. Control circuitry 304 may transmit the combined query to attribute database 700 (FIG. 7) to identify an attribute associated with the combination. In some implementations, the combined query may indicate whether the verbal input was received before or after the request to perform the playback adjustment. In some implementations, the attribute associated with the combination may differ depending on whether the verbal input was received before or after the request to perform the playback adjustment.

In some embodiments, control circuitry 304 may process the received verbal input to generate a string with words/phrases in the verbal input. Specifically, control circuitry 304 may generate a string that includes the words spoken by the user while accessing media asset 510. Control circuitry 304 may retrieve the identifier of the media asset that is presented in transport bar 548 from a storage device. Control circuitry 304 may also retrieve play position 542 that identifies at what play position in the media asset the words were spoken by the user. Control circuitry 304 may generate a communication using a data packet that includes the words/phrases, media asset identifier and the associated play position. Control circuitry 304 may transmit the generated communication to database 600. In some implementations, database 600 may be implemented on a remote server 415. In such circumstances, control circuitry 304 may transmit the data packet to remote server 415 and receive back from remote server 415 an expected playback adjustment and/or threshold period of time. The threshold period of time may represent an amount of time within which the expected playback adjustment is expected to be performed, following the receipt of the verbal input, in order to proceed to retrieve an attribute associated with the combination of verbal input and playback adjustment.

In some embodiments, database 600 may have multiple fields 610, 612 and 614. Field 610 may specify the verbal input (words spoken) received from a user during presentation of a media asset. Field 612 may specify an expected playback adjustment associated with the verbal input of field 610. Field 614 may specify the threshold period of time within which the expected playback adjustment is expected to be performed following the receipt of verbal input specified in field 610. Database 600 may include multiple entries 620. For example, one of the entries 620 in database 600 may indicate in field 610 that the verbal input having the word(s) "Huh", "What", "I don't get it", "repeat", or "confusing" is associated with the expected playback adjustment specified in field 612 of rewind, fast-access playback operation in reverse or previous chapter/segment. The entry also specifies in field 614 that the expected playback operation is expected to be performed or requested seven seconds following the receipt of the verbal input specified in field 610.

Control circuitry 304 may retrieve from database 600 the content of fields 612 and 614 of an entry corresponding to the verbal input (e.g., an entry having field 610 with contents matching the verbal input). In some implementations, control circuitry 304 may generate multiple words/phrases based on a single word/phrase received from the user as the verbal input. The multiple words/phrases may be words/phrases related to the verbal input. Control circuitry 304 may retrieve from database 600 the contents of fields 612 and 614 matching any one of the generated multiple words/phrases. By generating the multiple words/phrases based on a single word/phrase, control circuitry 304 increases the likelihood of finding a match in database 600.

In some embodiments, database 600 may correspond to a particular media asset or portion of a media asset. In such circumstances, control circuitry 304 may provide an identifier (e.g., title) of the media asset being consumed when the verbal input was received and/or a timestamp identifying a play position when the verbal input was received to database 600. Database 600 may use the media asset identifier and/or timestamp to identify fields 612 and 614 corresponding to the verbal input for the particular media asset and/or timestamp.

In some embodiments, control circuitry 304 may monitor for user requests to adjust playback in response to receiving the verbal input from the user. For example, control circuitry 304 may determine whether a user request to adjust playback (e.g., fast forward or rewind) is received. In some embodiments, in response to receiving the request to adjust playback from the user, control circuitry 304 may measure how long after the receipt of the verbal input the request to adjust playback was received. Control circuitry 304 may compare the requested playback adjustment with the expected playback adjustment retrieved from database 600 for the verbal input entry. When the requested playback adjustment matches the expected playback adjustment, control circuitry 304 may determine whether the measured amount of time is within the threshold period of time retrieved from database 600 for the verbal input entry. In response to determining that the playback adjustment matches the expected playback adjustment and was requested within the threshold period of time, control circuitry 304 may generate a combined query for transmission to database 700 (FIG. 7). The combined query may include a request for the attribute that matches a combination of the verbal input and the requested playback adjustment. In some implementations, database 700 may be implemented on remote server 415. In such circumstances, control circuitry 304 may transmit the combined query to remote server 415 and receive back from remote server 415 an attribute associated with the contents of the combined query.

In some embodiments, database 700 may have multiple fields 710 and 712. Field 710 may specify the verbal input (words spoken) received from a user during presentation of a media asset and the playback adjustment that was performed. Field 712 may specify an attribute associated with field 710. Database 700 may have multiple entries 720. For example, one of entries 720 may have a combination of words/phrases (e.g., "Huh", "What", "I don't get it", "repeat", or "confusing") and playback adjustment performed (e.g., rewind, fast-access playback operation in reverse or previous chapter/segment) as field 710 that is associated with the attribute specified in field 712 of difficult/confusing plot but interesting plot. In response to receiving the combined query from control circuitry 304, database 700 may identify whether any of entries 720 include one or more words in field 710 that match the verbal input specified in the query and one or more playback adjustments that match the playback adjustment specified in the combined query. In response to identifying an entry having field 710 that matches both of the components in the combined query (e.g., the verbal input and the playback adjustment), database 700 may retrieve the associated attribute from field 712 and return the retrieved attribute from field 712 to control circuitry 304.

For example, a user may consume a media asset and while the media asset is being presented the user may encounter a confusing segment. The user may express frustration with the segment verbally by speaking the words "Huh". Even though the segment was confusing, the user may desire to continue watching the media asset. Accordingly, within a few seconds of expressing frustration verbally, the user may press a rewind key on an input device to re-watch the portion of the media asset preceding the segment or to re-watch the segment itself. This sequence of events (e.g., verbal expression of frustration and rewinding) may indicate that the segment watched by the user may be confusing. Also, the user decision to continue watching the media asset even with the confusing segment may indicate that the media asset is still of interest to the user. Control circuitry 304 may monitor for this behavior and cross-reference this sequence of actions using one or more database 600 and 700 to associate an attribute with the media asset that identifies the media asset as having a confusing segment but is still of interest to the user.

For example, a user may consume a media asset and while the media asset is being presented the user may encounter a boring segment or segment of little interest to the user. The user may express this thought verbally by speaking the words "slow". Even though the segment was slow, the user may desire to continue watching the media asset. Accordingly, within a few seconds of expressing frustration verbally, the user may press a fast-forward key on an input device to move past the boring segment of the media asset. This sequence of events (e.g., verbal expression of boredom and fast-forwarding) may indicate that the segment watched by the user may be of little or no interest to the user. Also, the user decision to continue watching the media asset even with the boring segment may indicate that the media asset itself is still of interest to the user. Control circuitry 304 may monitor for this behavior and cross-reference this sequence of actions using one or more database 600 and 700 to associate an attribute with the media asset that identifies the media asset as having a boring segment but is still of interest to the user.

Control circuitry 304 may use the attributes assigned to the media asset to generate future recommendations and/or advertisements. In some embodiments, control circuitry 304 may transmit the assigned attributes to a remote server. The remote server may collect multiple attributes from various users and generate a representative attribute for the media asset and/or segments of the media asset. The remote server may associate the representative attribute with the media asset when a majority of the attributes received from various users (e.g., from a respective user equipment associated with each user) are the same or similar.

In some embodiments, an advertisement may be associated with the media asset or media asset segment based on the associated attribute. For example, an attribute that indicates a segment of a media asset is boring may cause an advertisement to be removed from that segment or media asset. Alternatively, an attribute that indicates a segment of a media asset is interesting may cause an advertisement to be added to that segment or media asset. Advertisements may be associated with a media asset or media asset segment based on the type of attribute associated with the media asset or media asset segment as determined by the combination of the verbal input and the playback adjustment request.

In some embodiments, one of the attributes in attribute field 712 may be a rating reduction or rating increase. In response to receiving an attribute that includes a rating reduction from database 700, control circuitry 304 may adjust or reduce a rating associated with the media asset. For example, the media asset may be associated with a 4 star rating. However, upon encountering a sequence of actions from a user where the user expresses a certain verbal input followed by a certain playback adjustment, control circuitry 304 may receive an indication that the sequence of actions is associated with an attribute that is a rating reduction. Accordingly, control circuitry 304 may reduce the rating from 4 stars to 3 stars for the media asset. In some embodiments, this rating adjustment may be performed for only the user who performed the playback adjustment and verbal input combination. Alternatively or in addition, the rating adjustment (e.g., reduction) may be communicated to a remote server for aggregation with other rating adjustments performed by other user equipment devices. In some embodiments, the remote server may only reduce the rating of the media asset when a majority of attributes received from various users indicate that the rating should be reduced.

In some embodiments, control circuitry 304 may present the assigned attribute(s) in a listing corresponding to the media asset. For example, control circuitry 304 may include an identifier of the attribute with one of the listings presented in the grid of display 100 (FIG. 1).

In some embodiments, a threshold period of time may not be considered when monitoring for playback adjustments. For example, while a user consumes a media asset, control circuitry 304 may receive verbal input from the user. Control circuitry 304 may monitor for user requests to adjust playback in response to receiving the verbal input from the user. In response to receiving a playback adjustment, control circuitry 304 may generate a combined query for transmission to a database of attributes (e.g., database 700). The combined query may include a request for the attribute that matches a combination of the verbal input and the requested playback adjustment. The database may identify one or more attributes that are associated with both the verbal input and the requested playback adjustment. The retrieved attribute(s) may be returned to control circuitry 304 for processing.

In some embodiments, a threshold period of time may be considered when monitoring for verbal input following the receipt of a playback adjustment. For example, while a user consumes a media asset, control circuitry 304 may receive a request to perform a playback adjustment. Control circuitry 304 may cross-reference the requested playback adjustment with database 600 to retrieve a verbal input associated with the playback adjustment and a threshold period associated with the playback adjustment. Control circuitry 304 may monitor for verbal input in response to receiving the request to perform the playback adjustment. In response to receiving the verbal input, control circuitry 304 may compare the received verbal input with the retrieved verbal input to determine whether the received verbal input matches the verbal input retrieved from database 600. In response to determining that the verbal inputs match, control circuitry 304 may determine whether the verbal input was received within the threshold period of time following the request to perform the playback adjustment. In response to determining that the verbal input was received within the threshold period of time following the request to perform the playback adjustment, control circuitry 304 may generate a combined query for transmission to a database of attributes (e.g., database 700). The combined query may include a request for the attribute that matches a combination of the verbal input and the requested playback adjustment. The database may identify one or more attributes that are associated with both the verbal input and the requested playback adjustment. The retrieved attribute(s) may be returned to control circuitry 304 for processing.

In some embodiments, a threshold period of time may not be considered when monitoring for verbal input following the receipt of a playback adjustment. For example, while a user consumes a media asset, control circuitry 304 may receive a request to perform a playback adjustment. Control circuitry 304 may cross-reference the requested playback adjustment with database 600 to retrieve a verbal input associated with the playback adjustment. Control circuitry 304 may monitor for verbal input in response to receiving the request to perform the playback adjustment. In response to receiving the verbal input, control circuitry 304 may compare the received verbal input with the retrieved verbal input to determine whether the received verbal input matches the verbal input retrieved from database 600. In response to determining that a matching verbal input was received following the request to perform the playback adjustment, control circuitry 304 may generate a combined query for transmission to a database of attributes (e.g., database 700). The combined query may include a request for the attribute that matches a combination of the verbal input and the requested playback adjustment. The database may identify one or more attributes that are associated with both the verbal input and the requested playback adjustment. The retrieved attribute(s) may be returned to control circuitry 304 for processing.

In some embodiments, control circuitry 304 may retrieve an attribute associated with verbal inputs and playback adjustments based on a threshold from a single database. For example, while a user consumes a media asset, control circuitry 304 may receive verbal input from the user. Control circuitry 304 may monitor for user requests to adjust playback in response to receiving the verbal input from the user. Control circuitry 304 may measure how long after receiving the verbal input the request to adjust playback was received. In response to receiving a playback adjustment, control circuitry 304 may generate a combined query for transmission to a database of attributes. The combined query may include a request for the attribute that matches a combination of the verbal input, the requested playback adjustment and the amount of time that elapsed between the verbal input and the request to perform the playback adjustment. The database may identify one or more attributes that are associated with all three components: the verbal input, the requested playback adjustment, and the elapsed time. The retrieved attribute(s) may be returned to control circuitry 304 for processing.

Figure 8:
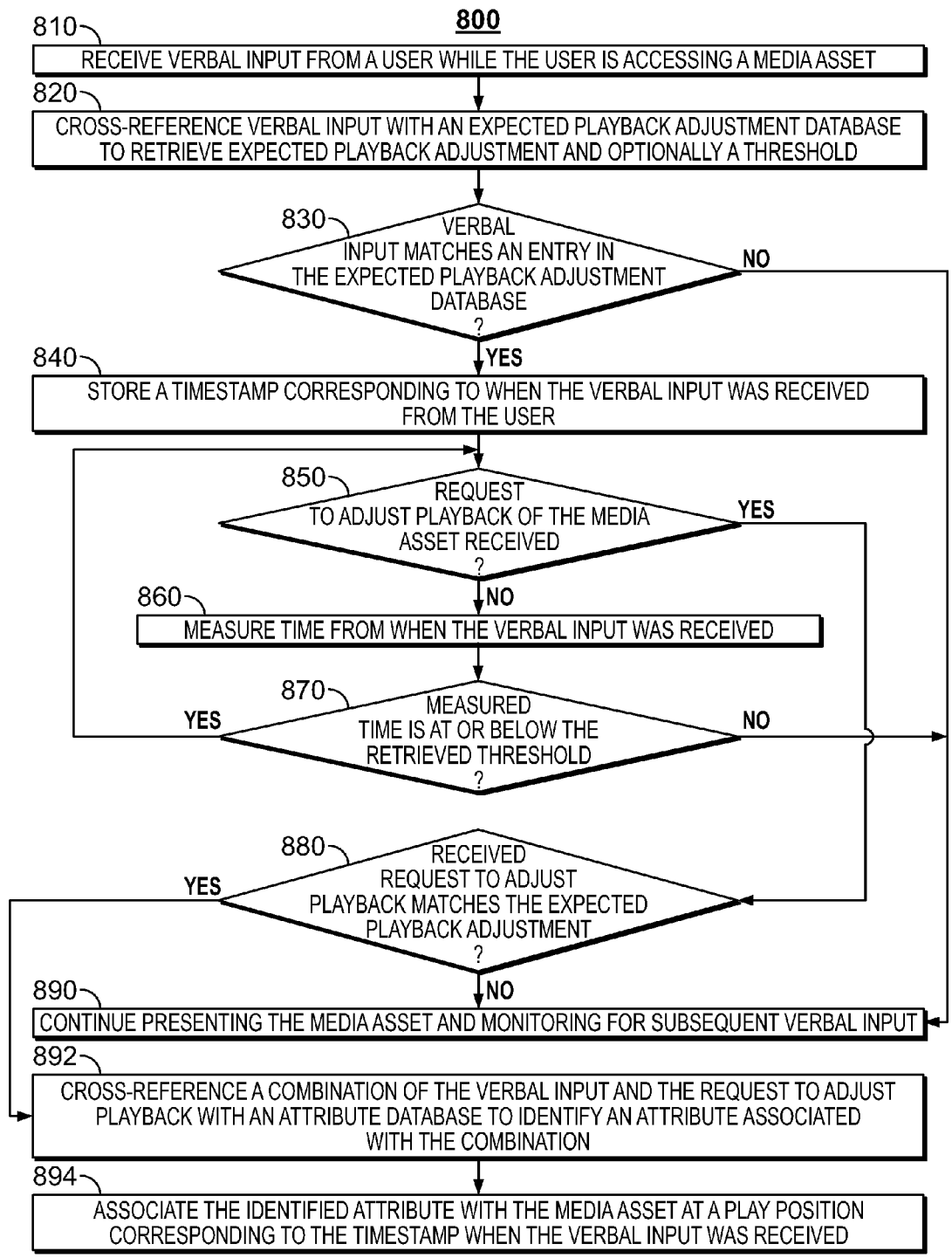
FIG. 8 is a diagram of a process for tagging a media asset based on verbal input received before a playback adjustment request in accordance with embodiments of the invention.

FIG. 8 is a diagram of a process 800 for tagging a media asset based on verbal input received before a playback adjustment request in accordance with embodiments of the invention. At step 810, verbal input is received from a user while the user is accessing a media asset. For example, voice recognition engine 316 may monitor a user's speech for verbal input or utterances received while the user watches media asset 510 (FIG. 5).

At step 820, the verbal input is cross-referenced with an expected playback adjustment database to retrieve an expected playback adjustment and optionally a time period threshold associated with the verbal input. For example, control circuitry 304 may convert the received analog verbal input to digital form and query database 600 to determine whether any words in database 600 match the words/phrases spoken by the user.

At step 830, a determination is made as to whether the verbal input matches an entry in the expected playback adjustment database. In response to determining that the verbal input matches an entry, the process proceeds to step 840, otherwise the process proceeds to step 890. For example, database 600 may identify an entry 620 having field 610 with one or more words/phrases that match the received verbal input. Database 600 may retrieve the contents of expected playback adjustment field 612 and optionally threshold time period 614 of entry 620 having the matching field 610 for provision to control circuitry 304.

At step 840, a timestamp corresponding to when the verbal input was received from the user is stored. In some implementations, the timestamp may represent the actual time that the verbal input was received. Alternatively or in addition, the timestamp may represent how many minutes/hours have elapsed since playback started (e.g., the start time of media asset 510) when the verbal input was received.

At step 850, a determination is made as to whether a user request to adjust playback of the media asset is received. In response to determining that the user request to adjust playback was received, the process proceeds to step 880, otherwise the process proceeds to step 860. For example, control circuitry 304 may monitor for inputs from the user that request the playback of media asset 510 to be adjusted (e.g., fast-forward operation or rewind operations).

At step 860, a time from when the verbal input was received to the current time is measured. For example, control circuitry 304 may compute a difference between a current time and the time corresponding to when the verbal input was received. In some embodiments, control circuitry 304 may compute a difference between a current playback position (e.g., before performing the playback adjustment) and the playback position when the verbal input was received.

At step 870, a determination is made as to whether the measured time is at or below the retrieved time period threshold. In response to determining that the measured time is at or below the threshold, the process proceeds to step 850, otherwise the process proceeds to step 890.

At step 880, a determination is made as to whether the received request to adjust playback matches the expected playback adjustment. In response to determining that the received request matches the expected playback adjustment, the process proceeds to step 892, otherwise the process proceeds to step 890. For example, control circuitry 304 may receive a set of expected playback adjustments (e.g., fast-forward and skip segment) from database 600. Control circuitry 304 may receive as the user request to perform the playback adjustment an instruction to fast-forward through a portion of media asset 510. Since the request to perform the fast-forward playback operation is the same as one of the expected playback adjustments in the set received from database 600 (e.g., fast-forward), control circuitry 304 may determine that the requested playback adjustment matches the expected playback adjustment.

At step 890, the media asset continues to be presented and verbal input is monitored for subsequent receipt of verbal input.

At step 892, a combination of the verbal input and the request to adjust playback is cross-referenced with an attribute database to identify an attribute associated with the combination. For example, control circuitry 304 may generate a combined query that includes the requested playback adjustment and the verbal input. In some embodiments, control circuitry 304 may only include in the combined query those words in the verbal input that were determined to match a word/phrase in database 600. Specifically, in case the user speaks three words when the verbal input is received but only one of those words match a word in database 600, control circuitry 304 may only include the one word that was found in database 600 in the combined query. The query may be transmitted to attribute database 700 (FIG. 7). Attribute database 700 may determine whether any entry 720 has field 710 that matches the contents of the combined query. Specifically, field 710 may include a set of multiple words/phrases in the verbal input and a set of multiple playback adjustments performed. In some implementations, the words/phrases in the combined query needs to match only one of the words in the set of the multiple words/phrases in the verbal input of field 710. Similarly, the requested playback adjustment in the combined query needs to match only one of the playback adjustments performed in the set of the multiple playback adjustments performed in the playback adjustments performed of field 710. Database 700 may identify the attribute from attribute field 712 that is associated with field 710 having contents that match the received combined query. The identified attribute is returned by database 700 to control circuitry 304.

At step 894, the identified attribute is associated with the media asset at a play position corresponding to the timestamp when the verbal input was received.

Figure 9:
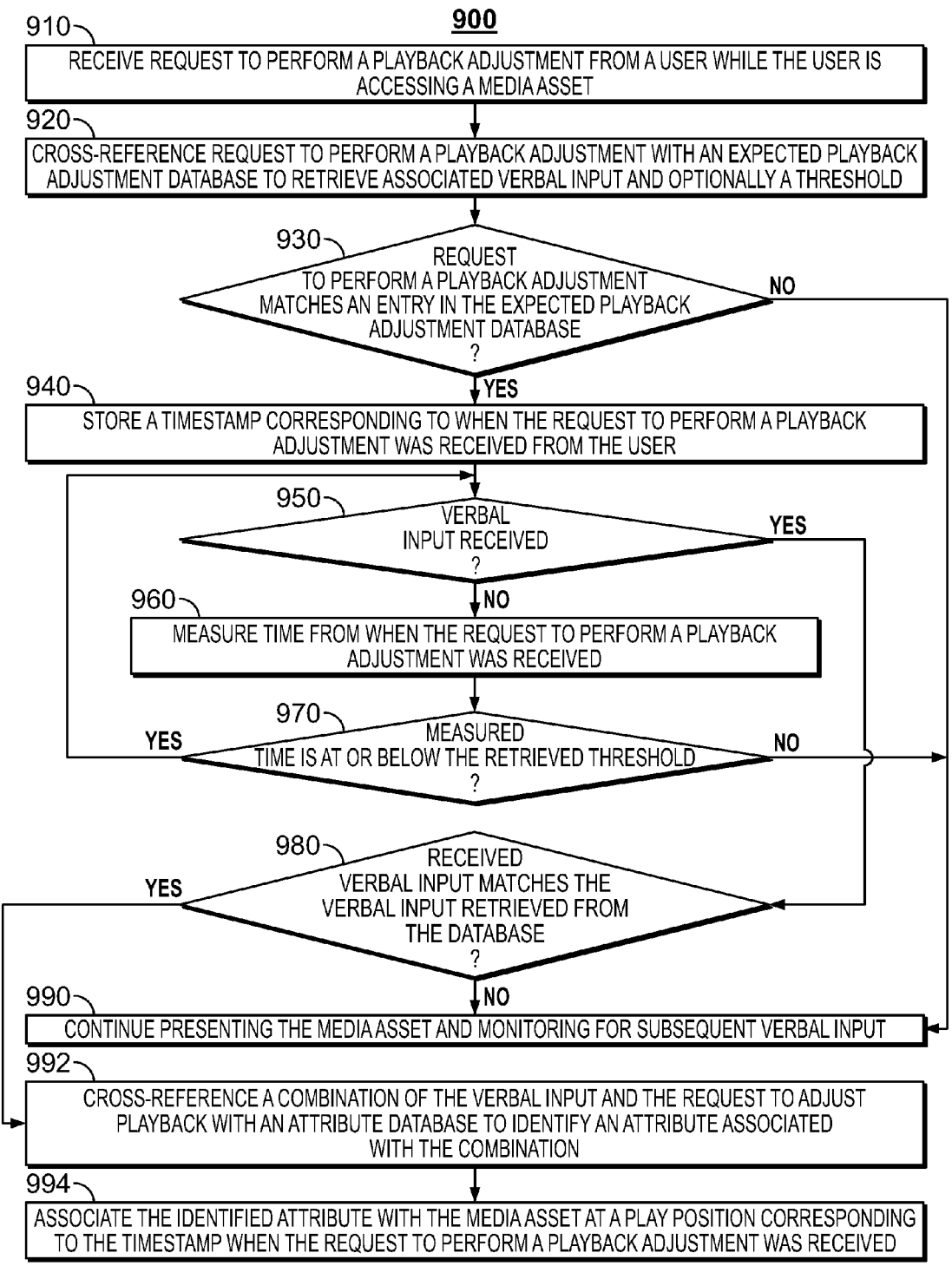
FIG. 9 is a diagram of a process for tagging a media asset based on verbal input received following a playback adjustment request in accordance with embodiments of the invention.

FIG. 9 is a diagram of a process 900 for tagging a media asset based on verbal input received following a playback adjustment request in accordance with embodiments of the invention. At step 910, a request to perform a playback adjustment is received from a user while the user is accessing a media asset. For example, control circuitry 304 may monitor for inputs from the user that request the playback of media asset 510 to be adjusted (e.g., fast-forward operation or rewind operations) (FIG. 5).

At step 920, the request to perform a playback adjustment is cross-referenced with an expected playback adjustment database to retrieve associated verbal input and optionally a time period threshold associated with the request to perform a playback adjustment. For example, control circuitry 304 may query database 600 to determine whether any playback adjustments in field 612 in database 600 match the request to perform a playback adjustment. Database 600 may return to control circuitry 304 the contents of fields 614 and 610 that correspond to the contents of field 612 that matches the request to perform a playback adjustment.

At step 930, a determination is made as to whether the request to perform a playback adjustment matches an entry in the expected playback adjustment database. In response to determining that the verbal input matches an entry, the process proceeds to step 940, otherwise the process proceeds to step 990.

At step 940, a timestamp corresponding to when the request to perform a playback adjustment was received from the user is stored. In some implementations, the timestamp may represent the actual time that the request to perform a playback adjustment was received. Alternatively or in addition, the timestamp may represent how many minutes/hours have elapsed since playback started (e.g., the start time of media asset 510) when the request to perform a playback adjustment was received.

At step 950, a determination is made as to whether verbal input is received while the user is accessing the media asset. In response to determining that the user request to adjust playback was received, the process proceeds to step 980, otherwise the process proceeds to step 960. For example, voice recognition engine 316 may monitor a user's speech for verbal input or utterances received while the user watches media asset 510 (FIG. 5).

At step 960, a time from when the request to perform a playback adjustment was received to the current time is measured. For example, control circuitry 304 may compute a difference between a current time and the time corresponding to when the request to perform a playback adjustment was received.

At step 970, a determination is made as to whether the measured time is at or below the retrieved time period threshold. In response to determining that the measured time is at or below the threshold, the process proceeds to step 850, otherwise the process proceeds to step 890.

At step 980, a determination is made as to whether the received verbal input matches the verbal input retrieved from the database. In response to determining that the received request matches the expected playback adjustment, the process proceeds to step 992, otherwise the process proceeds to step 990. For example, control circuitry 304 may receive a set of verbal inputs (e.g., different words/phrases) from database 600 that match the request to perform a playback adjustment. Control circuitry 304 may receive as the verbal input one or more words/phrases that correspond to one of the words/phrases in the received set of verbal inputs. Since the received verbal input is the same as one of the verbal inputs in the set received from database 600 (e.g., "What?"), control circuitry 304 may determine that the received verbal input matches the verbal input retrieved from the database.

At step 990, the media asset continues to be presented and verbal input is monitored for subsequent receipt of verbal input.

At step 992, a combination of the verbal input and the request to adjust playback is cross-referenced with an attribute database to identify an attribute associated with the combination. For example, control circuitry 304 may generate a combined query that includes the requested playback adjustment and the verbal input. In some embodiments, control circuitry 304 may only include in the combined query those words in the verbal input that were determined to match a word/phrase in database 600. Specifically, in case the user speaks three words when the verbal input is received but only one of those words match a word in database 600, control circuitry 304 may only include the one word that was found in database 600 in the combined query. The query may be transmitted to attribute database 700 (FIG. 7). Attribute database 700 may determine whether any entry 720 has field 710 that matches the contents of the combined query. Specifically, field 710 may include a set of multiple words/phrases in the verbal input and a set of multiple playback adjustments performed. In some implementations, the words/phrases in the combined query needs to match only one of the words in the set of the multiple words/phrases in the verbal input of field 710. Similarly, the requested playback adjustment in the combined query needs to match only one of the playback adjustments performed in the set of the multiple playback adjustments performed in the playback adjustments performed of field 710. Database 700 may identify the attribute from attribute field 712 that is associated with field 710 having contents that match the received combined query. The identified attribute is returned by database 700 to control circuitry 304.

At step 994, the identified attribute is associated with the media asset at a play position corresponding to the timestamp when the verbal input was received.

It should be understood, that the above steps of the flow diagrams of FIGS. 8 and 9 may be executed or performed in any order or sequence not limited to the order and sequence shown and described in the figure. Also, some of the above steps of the flow diagram of FIGS. 8 and 9 may be executed or performed substantially simultaneously where appropriate, combined, or performed in parallel to reduce latency and processing times.

The above-described embodiments of the present disclosure are presented for purposes of illustration and not of limitation, and the present disclosure is limited only by the claims which follow.

What is claimed is:

1. A method for tagging a media asset, the method comprising:
   receiving verbal input from a user while the user is accessing the media asset;
   receiving a request to adjust playback of the media asset;
   responsive to receiving the verbal input and the request, cross-referencing a combination of the verbal input and the request with an attribute database to identify an attribute associated with the combination; and
   associating the identified attribute with the media asset.

2. The method of claim 1 further comprising determining whether the request is received within a threshold period of time of receiving the verbal input.

3. The method of claim 2, wherein the combination is cross-referenced with the attribute database in response to determining the request is received within the threshold period of time of receiving the verbal input.

4. The method of claim 1 further comprising cross-referencing the verbal input with an expected playback adjustment operation database to identify an expected playback adjustment operation associated with the verbal input.

5. The method of claim 4, wherein the combination is cross-referenced with the attribute database in response to determining the requested playback adjustment operation matches the expected playback adjustment operation.

6. The method of claim 1, wherein the request to adjust playback is a stop playback request or a fast-access playback operation that includes at least one of rewind, fast-forward, skip chapter, next chapter, previous chapter, next segment, and previous segment.

7. The method of claim 1 further comprising transmitting a communication to a server with the identified attribute and an identifier of the media asset.

8. The method of claim 1, wherein the attribute is associated with a segment of the media asset presented to the user when the verbal input was received.

9. The method of claim 1 further comprising generating at least one of a recommendation and a search result based on the attribute associated with the media asset.

10. The method of claim 1, wherein the identified attribute comprises a reduced rating when the combination includes a word or phrase associated with user confusion and a request to stop playback, and wherein associating the attribute with the media asset comprises reducing a rating associated with the media asset.

11. A system for tagging a media asset, the system comprising:
control circuitry configured to:
receive verbal input from a user while the user is accessing the media asset;
receive a request to adjust playback of the media asset;
responsive to receiving the verbal input and the request, cross-reference a combination of the verbal input and the request with an attribute database to identify an attribute associated with the combination; and
associate the identified attribute with the media asset.

12. The system of claim 11, wherein the control circuitry is further configured to determine whether the request is received within a threshold period of time of receiving the verbal input.

13. The system of claim 12, wherein the combination is cross-referenced with the attribute database in response to determining the request is received within the threshold period of time of receiving the verbal input.

14. The system of claim 11, wherein the control circuitry is further configured to cross-reference the verbal input with an expected playback adjustment operation database to identify an expected playback adjustment operation associated with the verbal input.

15. The system of claim 14, wherein the combination is cross-referenced with the attribute database in response to determining the requested playback adjustment operation matches the expected playback adjustment operation.

16. The system of claim 11, wherein the request to adjust playback is a stop playback request or a fast-access playback operation that includes at least one of rewind, fast-forward, skip chapter, next chapter, previous chapter, next segment, and previous segment.

17. The system of claim 11, wherein the control circuitry is further configured to transmit a communication to a server with the identified attribute and an identifier of the media asset.

18. The system of claim 11, wherein the attribute is associated with a segment of the media asset presented to the user when the verbal input was received.

19. The system of claim 11 further comprising generating at least one of a recommendation and a search result based on the attribute associated with the media asset.

20. The system of claim 11, wherein the identified attribute comprises a reduced rating when the combination includes a word or phrase associated with user confusion and a request to stop playback, and wherein associating the attribute with the media asset comprises reducing a rating associated with the media asset.

* * * * *